(12) United States Patent
Drori et al.

(10) Patent No.: US 8,166,275 B2
(45) Date of Patent: Apr. 24, 2012

(54) METHOD AND APPARATUS FOR ACCESSING A MULTI ORDERED MEMORY ARRAY

(75) Inventors: Gil Drori, Petach-Tiqvah (IL); Omri Eisenbach, Tel Aviv (IL); Erez Bar Niv, Pardesiyaa (IL); David Dahan, Pardes Hanna (IL)

(73) Assignee: Ceva D.S.P. Ltd., Herzelia (IL)

( * ) Notice: Subject to any disclaimer, the term of this patent is extended or adjusted under 35 U.S.C. 154(b) by 562 days.

(21) Appl. No.: 11/931,833

(22) Filed: Oct. 31, 2007

(65) Prior Publication Data

US 2008/0052460 A1 Feb. 28, 2008

Related U.S. Application Data

(62) Division of application No. 10/848,066, filed on May 19, 2004, now abandoned.

(51) Int. Cl.
*G06F 12/10* (2006.01)
(52) U.S. Cl. ........................................ 711/202
(58) Field of Classification Search .................. 711/701
See application file for complete search history.

(56) References Cited

U.S. PATENT DOCUMENTS

| | | | |
|---|---|---|---|
| 4,137,565 A | 1/1979 | Mager et al. | |
| 4,959,776 A * | 9/1990 | Deerfield et al. | 711/217 |
| 5,579,453 A | 11/1996 | Lindenfelser et al. | |
| 5,949,429 A * | 9/1999 | Bonneau et al. | 345/619 |
| 6,108,743 A | 8/2000 | Debs et al. | |
| 6,260,081 B1 | 7/2001 | Magro et al. | |
| 6,449,664 B1 | 9/2002 | Honary et al. | |
| 6,721,820 B2 | 4/2004 | Ziberman et al. | |
| 6,745,310 B2 | 6/2004 | Chow et al. | |
| 2004/0019712 A1 | 1/2004 | Takase | |
| 2005/0223131 A1 | 10/2005 | Goekjian et al. | |
| 2005/0262275 A1 * | 11/2005 | Drori et al. | 710/22 |

FOREIGN PATENT DOCUMENTS

EP 1026596 8/2000

* cited by examiner

*Primary Examiner* — Duc Doan
(74) *Attorney, Agent, or Firm* — Browdy and Neimark, PLLC

(57) ABSTRACT

A method and system for transferring data in a multi ordered memory array from a source memory array to a destination memory array, at least one of which is multi-ordered. A reading memory access unit reads data from the source memory array according to a source access template and a writing memory access unit writes the data to the destination memory array according to a destination access template.

24 Claims, 5 Drawing Sheets

FIG. 2B

METHOD AND APPARATUS FOR ACCESSING A MULTI ORDERED MEMORY ARRAY

FIELD OF THE INVENTION

This invention relates to memory access and more specifically to accessing multi order memory arrays.

BACKGROUND OF THE INVENTION

Many computer systems include peripheral unites accompanying a core processor. Such a peripheral unit is a Direct Memory Access (DMA) controller.

Efficient memory access and management has been a subject for research and development for a long time. For example, U.S. Pat. No. 4,137,565 (published 1979, assigned to Xerox Corporation), incorporated herein by reference, discloses a controller for a host machine such as an electrostatographic copier having a central processing unit module connected via a system bus to an input-output processing unit module, and a direct memory access system functioning as part of the input-output processing unit module and operative to provide a high-speed means of refreshing and updating control registers in the host machine by direct accessing of memory in the central processing unit module. The direct memory access system may be programmed to synchronously refresh-update the host machine's control registers as in its normal mode and also asynchronously refresh-update the control registers as in the abnormal mode of a detected electrical disturbance in the electro-sensitive periphery surrounding the control registers, thus requiring restoring thereof. High-speed movement of data by the direct memory access system is achieved through dedicating a portion of random access memory in the central processing unit module for such accessing, and transferring control of the system bus from the central processing unit module to the direct memory access system. This enables data accessed through a fixed sequence of addresses from dedicated memory to be transferred directly to the host machine's control registers without incurring time constants that would otherwise be incurred if the data were to be manipulated by a central processor in the central processing unit module.

Since then, efforts have been made to improve efficiency of memory access and management. For example, EP 1,026,596, incorporated herein by reference, (published 2000, in the name of SUN Microsystems, Inc.) discloses a direct memory access (DMA) controller for a computer system having a processor and a command buffer. The command buffer can be defined, for example, as a ring buffer in the main processor memory and can be directly accessible by the processor, for example over a bus. The DMA controller provides a head register and a tail register operable to hold a head pointer and a tail pointer for addressing the head and tail, respectively, of a sequence of direct memory access commands in the command buffer. The processor is able to store DMA commands in the command buffer. Subsequently, the DMA controller is able to access those DMA commands using the DMA tail pointer held locally in the DMA controller. The DMA controller is operable to compare the head and tail pointers, and to respond to non-equivalence thereof to use the tail pointer value to access direct memory access commands from the command buffer. The DMA controller is responsible for updating the tail pointer in the DMA controller in association with reading of a direct memory access command from a location in the command buffer. The processor is responsible for updating the head pointer in the DMA controller in association with the storing of DMA commands in the command buffer.

However, sometimes memory access requires accessing memory addresses that are not linear. This typically occurs, for example, in image processing. Accessing non-linear memory addresses is done, in most cases, by implementing multiple channels that require management and limit performance.

U.S. Pat. No. 6,108,743, incorporated herein by reference, (published 2000, assigned to Intel Corporation and Real 3D Inc.) discloses a method for performing direct memory access, which includes arbitrating between a chained, low priority, direct memory access and a high priority, direct memory access, the arbitration occurring between two links in the chained, low priority, direct memory access.

In the field of memory access in image processing U.S. Pat. No. 6,449,664, incorporated herein by reference, (2002, assigned to ViewAhead Technology, Inc) discloses a two-dimensional direct memory access system that maximizes processing resources in image processing systems. The system disclosed in U.S. Pat. No. 6,449,664 includes a two-dimensional direct memory access machine and a ping-pong style memory buffer to assist in the transfer and management of data, such as image data. The two-dimensional direct memory access machine transfers a specific cross sectional area of the image data to a processor.

U.S. Pat. No. 5,579,453, incorporated herein by reference, (published 1996, assigned to Xerox Corporation) discloses a smart direct memory access controller for data space transformation. The smart direct memory access controller can be used in computer systems to read and/or write data in a non-linear fashion in order to alter the organization of data stored within the computer system. The direct memory access controller has particular application in the electronic subsystem of a non-raster format electronic printer, such as a partial width array or full width array thermal ink jet printer. The smart direct memory access controller enables a non-raster format printer to access images organized in raster format, by viewing the data space as a non-linear or multi-dimensional memory. Memory addresses of the non-linear or multi-dimensional address space are a catenation of several data fields. Each field is one of the coordinates that define the location of data within memory. In the smart direct memory access controller any one or more of the fields can increase when it comes time to increment the address, giving rise to data streams that are actually vectors through the data space.

U.S. Pat. No. 6,260,081, incorporated herein by reference, (published 2001, assigned to Advanced Micro Devices, Inc.) discloses a direct memory access engine that supports multiple virtual direct memory access channels. The direct memory access engine includes a direct memory access controller and a parameter table in memory containing parameters for a plurality of virtual direct memory access channels. The controller engine provides a single physical direct memory access channel and a plurality of virtual direct memory access channels. One direct memory access channel of the plurality of virtual direct memory access channels may be active at a given time. The parameters for the active channel may be loaded from the parameter table to a physical direct memory access control block and a physical direct memory access channel resource of the direct memory access controller. The physical direct memory access control block of the direct memory access controller utilizes the physical direct memory access channel resource to perform a direct memory access transfer for the active channel based on the loaded parameters. The physical direct memory access channel resource is shared by the plurality of virtual direct memory access channels. The direct memory access engine further includes a direct memory access request line and a direct memory access acknowledge line for an active channel of the plurality of virtual direct memory access channels.

SUMMARY OF THE INVENTION

It is an object of the invention to provide a method and apparatus for transferring data in a multi ordered memory array from a source memory array to a destination memory array, at least one of which is multi-ordered.

This objective is realized in accordance with a first aspect of the invention by method accessing a multi ordered memory array using a single channel, the method comprising:

determining an access template for accessing n (n>O) orders in the memory array; and accessing said memory array according to said access template.

According to another aspect of the invention, there is provided a method for transferring data by a memory controller from a source array to a destination array, the method comprising:

determining a source access template for reading n orders from said source memory array;

determining a destination access template for writing m orders to said destination memory array;

reading data from said source memory array according to said source access template; and writing data to said destination memory array according to said destination access template;

where at least one of n or m>0.

According to another aspect of the invention, there is provided a memory access unit for accessing a multi ordered memory array using a single channel, the access controller comprising:

access configuring registers for storing access parameters being part of an access template, said access template allowing accessing n orders in the memory array; and an access controller coupled to said access configuration registers for accessing said memory array according to said access template.

According to yet another aspect of the invention, there is provided a transfer controller for transferring data in a memory controller from a source memory array to a destination memory array, the transfer controller comprising:

a reading memory access unit for reading data from said source memory array according to a source access template; and a writing memory access unit for writing data to said destination memory array according to a destination access template.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 2B illustrates a memory map for the image illustrated in FIG. 2A, wherein pixels are numbered to indicate their memory address, according to one embodiment of the invention.

DETAILED DESCRIPTION OF EXEMPLARY EMBODIMENTS

Figure 1:
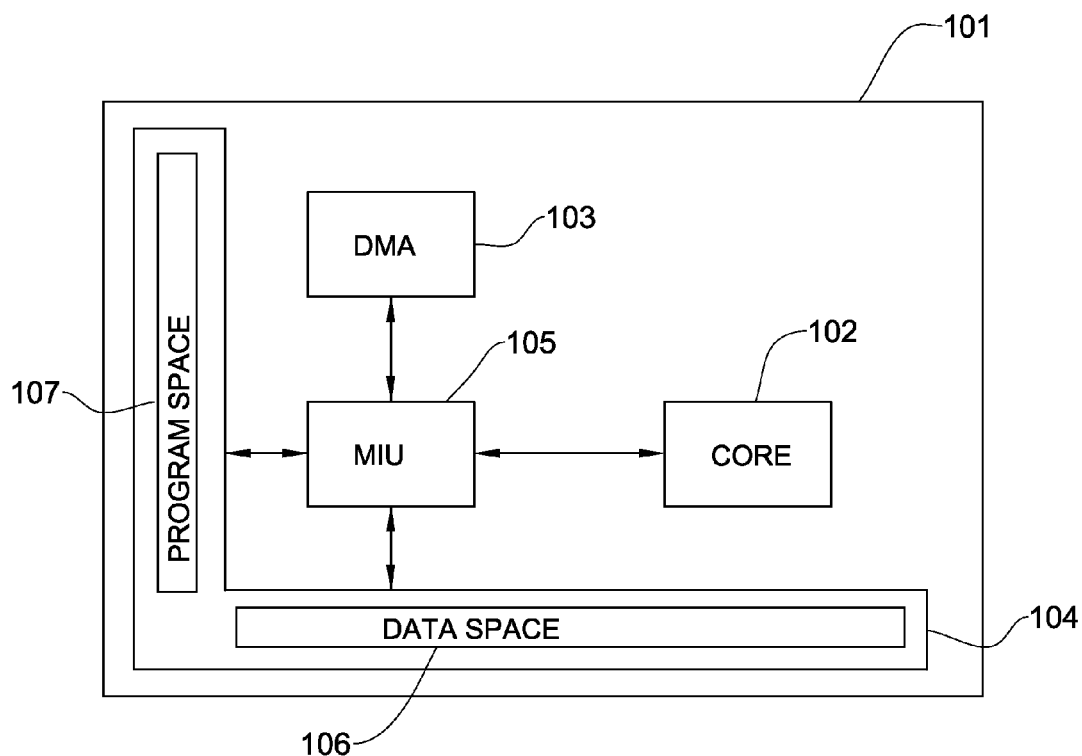
FIG. 1 is a block diagram illustrating a computer system implementing a direct memory access controller according to one embodiment of the invention.

FIG. 1 is a block diagram illustrating a computer system 101 implementing a direct memory access controller according to one embodiment of the invention. A core processor 102 and a Direct Memory Access controller 103 (referred to hereinafter as "DMA") both access data stored in the system's main memory 104. A Memory Interface Unit ("MIU") 105 is used as an interface to the memory, enabling the DMA and the core to access data stored therein. The main memory 104 is divided into several address spaces of which a data memory space 106 and a program memory space 107 are relevant to the present embodiment. Among its other roles, the MIU 105 prevents conflicts resulting when the core processor 102 and the DMA controller 103 try to access the same memory address at the same time.

During processing it is often required to rearrange data, and move data segments from one location in memory constituting a "source location" to another location constituting a "destination location", i.e. "data transfer". Data transfer can be performed by the core processor 102, however, it is considered as a bottleneck to the core processor's operation. In the absence of a DMA controller 103, the core processor 102 dedicates timeslots for memory management, which would otherwise be dedicated to core processing computations. Therefore, it is the responsibility of the DMA controller 103 to manage and transfer data stored in memory, memory management that is performed in parallel to the core processor's operation. The DMA controller 103 transfers the data between locations in memory with or without restructuring, i.e. data stored in a source location is transferred to be stored in a destination location.

When data transfer is done without restructuring, the sequence of data in the destination location is kept the same, as was the sequence in the source location. If the memory is considered as an equivalent to a bitmap, the data transfer can be considered as if an image of the source location is moved to the destination location. When data transfer is done with restructuring, the sequence changes. That is, the "destination image" formed after the data transfer is not identical to the "source image" that existed before it.

The core processor 102 then accesses the data in the destination location, performing operations thereon. Sometimes it may happen that the core processor 102 and the DMA controller 103 both try to access the same memory address at the same time, a situation that gives rise to a conflict whose result is indefinite. In order to prevent such conflicts from occurring, memory access (done by the DMA controller or by the core processor) is performed by the Memory Interface Unit (MIU) 105.

One exemplary embodiment will now be described with reference to the computer system 101 being used for image processing. According to this embodiment, an image is composed of pixels, and a pixel is composed of several sequential bits in memory, and therefore it is considered to be the smallest factor comprising an image. Furthermore, it is possible to divide an image to form several portions, such as rectangular portions. Each such portion can be further divided to form blocks, wherein each block is considered as a two dimensional array of pixels arranged in several lines. Altogether, a whole image is sometimes referred to as a "sample" by those versed in the art. Hence, an image, or sample, can be viewed as a 4-order pixel array: the first order represents pixels, the second represents lines within a block, the third order represents blocks within a portion and the forth represents portions within the sample. It will be appreciated that it is possible to divide an image in a different way than dividing it to pixels, lines, blocks and portions. Therefore, generally, instead of referring to a 4-order memory array it is possible to refer to a multi-order memory array.

Figure 2A:
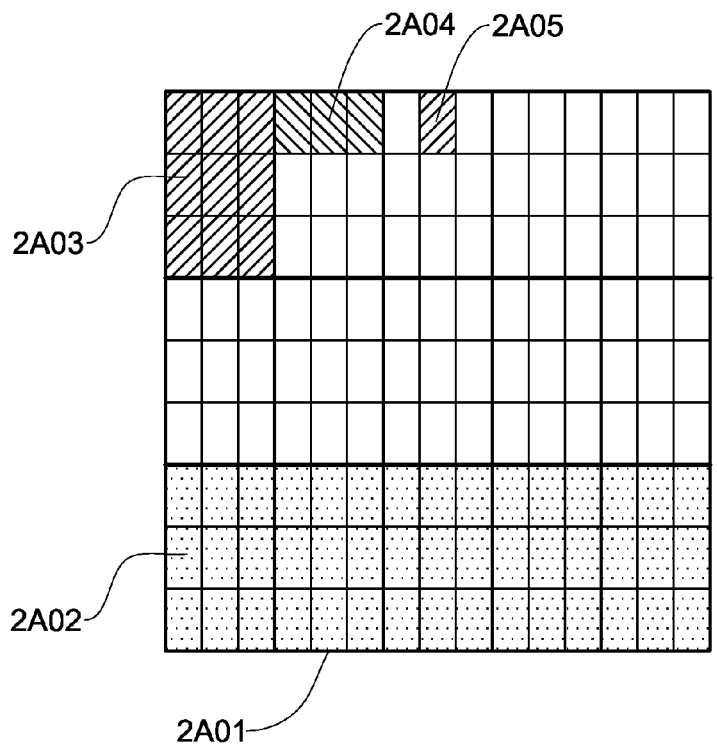
FIG. 2A illustrates an exemplary multi-order memory array representing an image according to an embodiment of the invention.

FIG. 2A illustrates such an exemplary multi-order memory array representing an image according to an embodiment of the invention. According to the illustrated embodiment, a sample 2A01 is divided into several portions 2A02, three of which are marked in the figure. The illustrated exemplary image (i.e., sample 2A01) includes 3 portions 2A02. Each portion 2A02 includes several blocks 2A03 (in the figure, each portion includes 5 blocks). As before, one block 2A03 is marked in the figure. Each block 2A03 includes several lines 2A04 (in the figure each block includes 3 lines) and each line 2A04 includes several pixels 2A05 (in the figure each line includes 3 pixels). This embodiment is non-limiting, and generally the number of orders can be greater or smaller than four, such as in the case of video, wherein several samples (which in this case are commonly referred to as "video-frames") are processed in sequence. In the case of video-frames, several video-frames can constitute a fifth order. Therefore, generally the memory structure may be considered as a multi-order array.

The above embodiment is not limited to image processing, and therefore, instead of using terms such as "line", "block", "portion" and "sample", general terms "element", "block", "cluster" and "frame" are used for the first, second, third and fourth orders, respectively. Each "element" comprises data stored sequentially in memory. The term "frame" should not be confused with the term "video-frame" used in video processing.

As previously explained, other orders of a multi-order collection may also exist, and therefore the term "order" (marked by 'O') is a general term that will be used, wherein the term "member" is the general term used to describe a member of an order. For example, elements form the first order ($O_0$); while a certain element is a member of the first order.

Figure 2B:
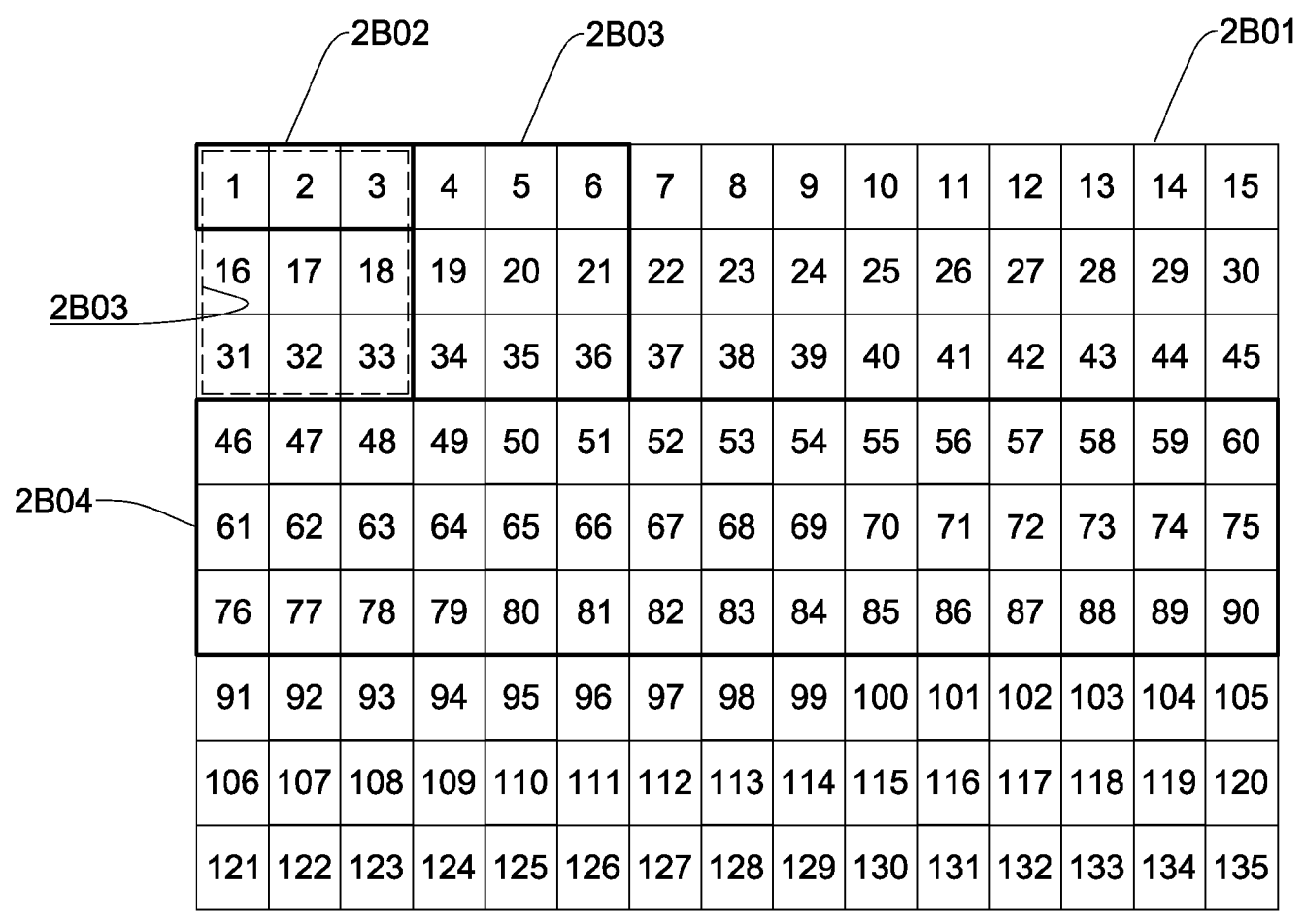

Hence, it is possible to view memory mapping as being analogous to bitmaps. In order to simplify the exemplary embodiments that will now be described, three orders are illustrated, wherein several pixels form together the first order. It should be further clarified that a bitmap can be composed of non-sequential memory addresses as illustrated in FIG. 2B, illustrating a memory map 2B01 for the image illustrated in FIG. 2A, wherein pixels are numbered to indicate their memory address, according to one embodiment. As shown in FIG. 2B the memory map (2B01) includes 135 addresses, represented by numbers (1 to 135).

Looking at an element 2B02, it is possible to notice that in this case the addresses included therein are sequential memory addresses (e.g., 1, 2, 3 or 16, 17, 18). However, this is non-limiting, and members of other embodiments can have non-sequential addresses as will further be demonstrated with the cluster and frame memory structure, as illustrated in FIG. 2B. Looking again at FIG. 2B, a block 2B03 is illustrated having three elements each of which has sequential memory addresses but having a gap between each of the three elements such that the block 2B03 includes non-sequential memory addresses corresponding to the end of one element and the start of the next element (e.g., 4, 5, 6,19, 20, 21,34, 35, 36 where the underline represents "jumps" between non-sequential addresses). It should be noted that the block 2B03 can be overlapping to the element 2B02 as illustrated in the figure in dashed lines.

Even more complicated is the structure of a cluster (2B04) being composed of multiple blocks each having multiple elements. Seeing that all the elements in each block are accessed before a successive block is accessed, there exist non-sequential jumps between successive blocks. Specifically, the sequence of addresses composing the cluster 2B04 is 46, 47, 48,61, 62, 63̄76, 77, 78̄49, 50, 51,64, 65, 66,79, 80, 81,52, 53, 54,67, 68, 69,82, 83, 84,55, 56, 57,70, 71, 72,85, 86, 87,58, 59, 60,73, 74, 75,88, 89, 90. Such a sequence of memory addresses contains non-sequential memory addresses as shown by the underlined memory addresses, where a single line represents positive jumps and double lines represent negative jumps of memory addresses. It seems that the more orders there are in the multi-ordered bitmap, the more complicated and less sequential it may become. It is clear that, although not shown in the figure, the cluster 2B04 can be overlapping to the block 2B03, in a way similar to the overlapping demonstrated for block 2B03 and element 2B02.

For reading memory blocks, channels are normally used. For example, see U.S. Pat. No. 6,260,081. It is currently acceptable in the art to use a channel for reading sequence of addresses. Thus, in order to read a block 2B03 as illustrated in FIG. 2B, for example, three channels are used (e.g., one for reading addresses 1-3, the second for reading addresses 16-17 and the third for reading addresses 31-33). The number of channels supported by a DMA controller is limited, and therefore the controller's resources may become exhausted and performance will deteriorate. The disclosed embodiment offers a way to read non-sequential memory addresses composing a multi-ordered bitmap using a single channel.

It should be noted that the magnitudes mentioned in connection with FIGS. 2A and 2B above for the different orders are non-limiting, and different magnitudes can be used as appropriate. For example, non-limiting values for the magnitude of an element can be 8 bits, 16 bit, 32 bits or any other applicable number. Another way to measure the magnitudes of elements, instead of using bits as the measure, is by words, as known to those versed in the art, wherein a word can represent 8 bits, 16 bits, 32 bits or any other number of bits.

Measuring magnitudes of higher orders is more complicated and may become negative as explained below. Therefore, two measures are used hereinafter to reflect magnitudes of members and orders, the measures are "size" and "offset". The offset of a member is the address where the member terminates plus one minus the address where it starts. According to the invention all members of the same order are characterized by the same offset, therefore, it is possible to say that the offset of a member is also the offset of the order to which this member belongs. Thus, the offset of an order i is marked $OOf_i$. Offsets are measured in words or in any other terms that are used to measure the magnitude of an element ($O_0$), such as bits or bytes.

It should be noted that unless specifically noted hereinafter, offsets are generally measured as the address where a member terminates plus one minus the address where the member starts. However, according to different embodiments it is possible to measure offsets in different ways (for example, an offset can be measured as the address where the member terminates minus the address where the member starts). In such case all the computations and flow charts should be adapted as can be appreciated by any person versed in the art.

Size (marked as S) is the number of members of a certain order in the higher order. For example, the size $S_1$ of a block (a block being a member of the second order $O_1$) is the number of elements in the block. That is, $S_1$ is the number of members of order $O_0$ in a member of $O_1$. According to the invention, the size of all members of a certain order is similar, and therefore, $S_i$ is referred to as the size respective of the i'th order ($O_i$).

It should be noted that according to some embodiments, the size of the first order (i.e., $S_0$) is the number of words composing a member of this order (alternatively $S_0$ can be measured in bits, bytes or any appropriate term) and in this case $S_0$ can be considered as identical to its offset (i.e., $OOf_0$).

Figure 2C:
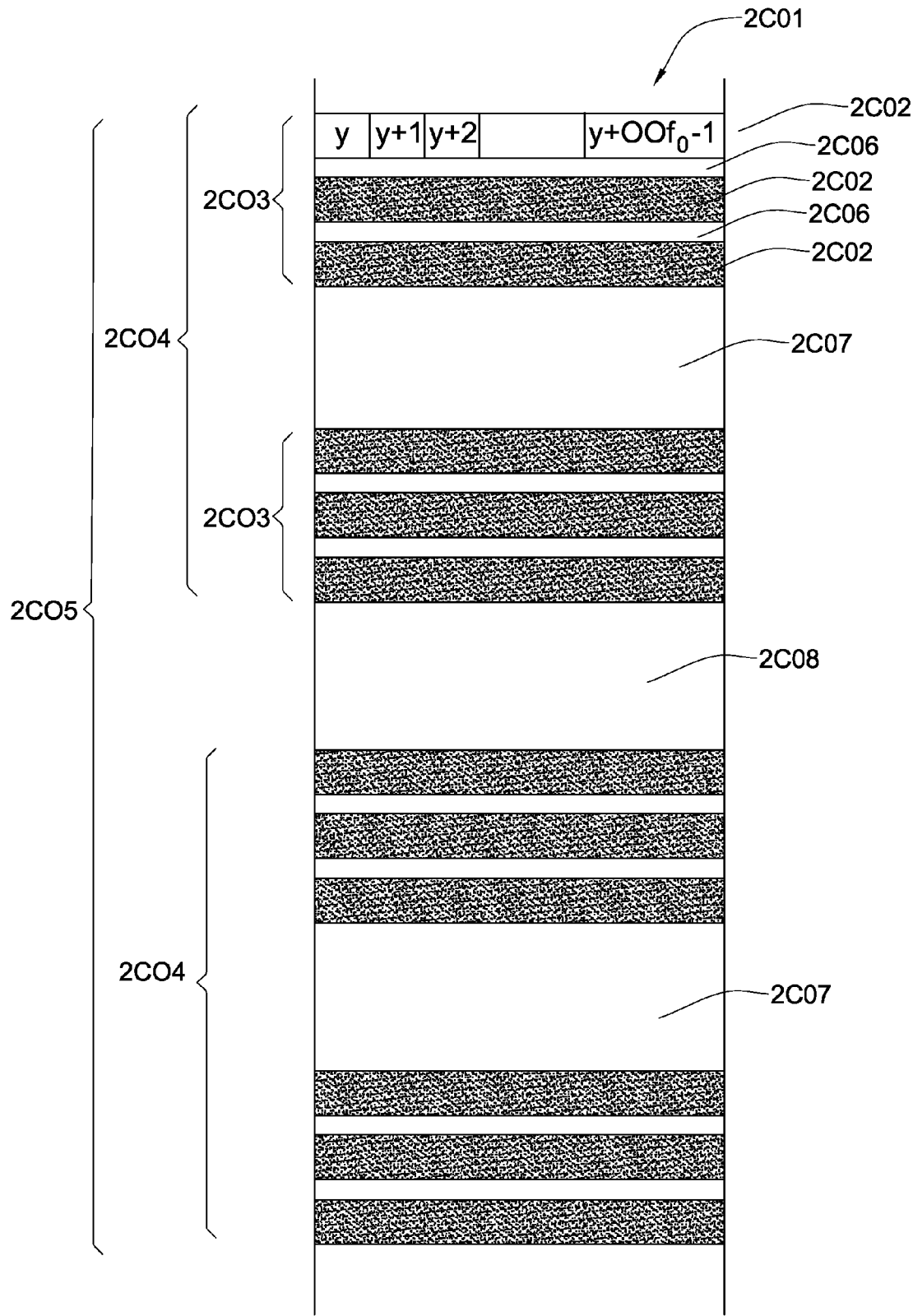
FIG. 2C illustrates a different view of a memory map, according to one embodiment of the invention, further emphasizing a memory array division into orders.

FIG. 2C illustrates a different view of a memory map, according to one embodiment, further emphasizing a memory array 2C01 division into orders. Generally, the different orders are marked as $O_i$, where $i=0, 1, 2, 3, \ldots, n-1$, and n stands for the number of orders. Each order ($O_i$) is characterized by a respective order offset ($OOf_i$) and by a respective size ($S_i$). An element 2C02 is a member of the first order ($O_0$) according to this embodiment. According to this embodiment the element offset is $OOf_0$ words. As previously mentioned, being a member of the lowest order $O_0$, the memory addresses included in an element are sequential. According to this example, three elements 2C02 constitute a block 2C03 (that is, $S_1=3$), two blocks 2C03 constitute a cluster 2C04 ($S_2=2$), and two clusters 2C04 constitute a frame 2C05 ($S_3=2$). That is, in this example the numbers of orders to be accesses (n) is n=3. That is, there is only one frame and therefore clusters ($O_2$) constituting this single frame are the last members to be accessed. In other words, n indicates how many orders ($O_i$ for $i=0, \ldots, n-1$) are to be accessed.

As previously explained, in connection to FIG. 2B, memory sequence composing blocks 2C03, clusters 2C04 or frames 2C05 need not necessarily be sequential. According to the current embodiment, there is a gap of a predetermined offset between two successive elements 2C02 in a block 2C03. The gap is referred to as an "element gap" 2C06 ($G_0$), and the offset of the element gap is referred to as an "element gap offset" ($GOf_0$). The offset $GOf_0$ of the element gap 2C06 can be similar to or different than the offset $OOf_0$ of the element 2C02. In addition, $GOf_0$ can be positive (larger then zero), negative or substantially equal to zero, regardless of whether $OOf_0$ is positive or negative. For example, the element offset ($OOf_0$) in the embodiment illustrated in FIG. 2B is 3 (such as 3 words). The element gap offset ($GOf_0$) in FIG. 2B is 12.

It should be noted that unless specifically noted hereinafter, gap offsets are generally measured as the address where a gap terminates plus one minus the address where the gap starts. However, according to different embodiments it is possible to measure gap offsets in different ways (for example, an offset can be measured as the address where the gap terminates minus the address where the gap starts). In such case all the computations and flow charts should be adapted as can be appreciated by any person versed in the art.

However, as previously mentioned this example is not limiting and negative gap or member offsets can exist as well. For example, consider a block including two elements where the element offset is 2 and the element gap offset is −6. In this case the overall offset of the block including two elements would be −2 (2−6+2=−2 or in a different way, assuming that the first element starts at address 0: −2+1−1=−2).

A gap referred hereinafter as "block gap" 2C07 ($G_1$) of a respective predetermined offset ("block gap offset", $GOf_1$) can also exist between two successive blocks (members of $O_1$) in a cluster, i.e., between the last address of the last element 2C02 composing a block 2C03 and the first address of the first element 2C02 of the successive block 2C03. In the example illustrated in FIG. 2B, the block gap offset $GOf_1$ is −30. To illustrate this block gap offset, looking at FIG. 2B, the first block occupies addresses 1, 2, 3, 16, 17, 18, 31, 32 and 33 while the second block occupies addresses 4, 5, 6, 19, 20, 21, 34, 35 and 36. Therefore, the first block terminates at address 33 (i.e., the coming block gap starts at address 34), and the next block starts at address 4 (i.e., gap terminates at address 3, wherein 3+1=4), where 4−34=−30, which is the block gap offset $GOf_1$. FIG. 2C also illustrates the existence of a "cluster gap" 2C08 ($G_2$) with a respective predetermined cluster gap offset $GOf_2$ between two successive clusters 2C04 (members of $O_2$) in a frame 2C05 (a member of $O_3$).

It should be noted that as the number of orders is unlimited by the invention, there may exist also other predetermined "gap" values, characterizing gaps between any two successive members of the same order. Therefore "order gap" ($G_i$) is the general term used hereinafter to describe the gap between any two successive members of the respective order ($O_i$), each order gap $G_i$ has a respective "order gap offset" $GOf_i$, which is the offset of the gap between two successive members of the same order $O_i$ in a member of a higher order $O_i+1$. Further on, as illustrated before with reference to the block gap offset, every order gap offset $GOf_i$ can be of positive, negative of substantially equal to zero magnitude.

Previously (with reference to FIGS. 2A and 2B), a memory map was referred to as analogous to a bitmap. Further on, in light of FIG. 2C, it is possible to refer to a memory map in terms of an "array".

It should be noted that element gaps illustrated in FIGS. 2A and 2B are occupied by data of other elements. However, this is not limiting and the element gaps, as well as any other order gap (the term order gap is explained below) can be free, i.e. it can include no data. Alternatively, an order gap can include other data that is not part of the array. In addition it is possible that one or more parts of an order gap can be occupied by data while other parts can be free.

It was previously mentioned, with reference to FIG. 1, that the DMA controller performs data transfers, i.e., the DMA controller is in charge of moving segments from the source location to the destination location. That is, in data transfer a source array is transferred to occupy a different location, constituting a destination array. According to one embodiment of the invention, the source and/or destination arrays can be multi order arrays.

In order to transfer such a source array, one embodiment of the invention is disclosed having n orders, wherein each order $O_i$ (where $i=0, 1, \ldots, n-1$) is characterized by a respective size $S_i$ (where $i=1, \ldots, n$) and a respective offset $OOf_i$, (where $i=0, 1, \ldots, n-1$). In the non-limiting example, where n=3, the element offset is 3 words ($OOf_0=3$), the block size is three elements ($S_1=3$), the block offset is 34 words ($OOf_1=34$), the cluster size is two blocks ($S_2=2$), the cluster offset is 45 words ($OOf_2=45$), the frame size is two clusters ($S_3=2$). According to the same example, the offsets of the order gaps are also predetermined and are $GOf_0=12$, $GOf_1=−30$ and $GOf_2=15$. The numbers used in this example can be assigned to the exemplary embodiment illustrated in FIG. 2C. It should be noted that according to this example the array illustrated in FIG. 2C is considered as a 3-order array (that is, n=3) as there is only one frame in the array. If the array would have had four orders, for example, we would have expected to find at least 2 frames therein ($S_4>=2$), while the number of the fifth order's members would be 1.

After explaining the structure of the array of FIG. 2C, it is possible to appreciate that an access template can be defined, whereby the structure of the array is provided. Such a template can include a number of orders n and the first order offset ($OOf_0$), wherein for each order $O_i$ (where i=0, ..., n−1) the respective order gap offset ($GOf_i$) and order size ($S_i$) are provided.

Thus, knowing a start address (SA) of a memory array, i.e. the address where the first element in the memory array starts, as well as knowing the access template, it is possible to compute specific addresses within the memory array, such as the address where a certain element starts, the address in which a certain block starts, or the address in which a certain cluster starts, etc.

Equation 1 discloses an exemplary way to compute addresses within a memory array:

$$\text{Address} = SA + (\text{location\_vector}[0] - 1)(OOf_0 + GOf_0) + \sum_{i=1}^{n-1} (\text{location\_vector}[i] - 1)(OOf_i + GOf_i) \quad (1)$$

Wherein:
location_vector[i]–position of a member of the ith order in a member of the ith+1 order.

Computing $OOf_i$ can be done in accordance with Equation 2:

$$OOf_j = (S_j - 1)GOf_{j-1} + S_j OOf_{j-1} \quad (2)$$

Wherein:
j=1, 2, ..., n;
and wherein
$OOf_0$ is a predetermined constant

An element ($O_0$) within an array can be identified by its position within the array, i.e., if n is the number of orders in the array, the element can be denoted as (location_vector[0], location_vector[1], ..., location_vector[n−1]). That is, an element denoted as (3, 1, 2) is the third element (location_vector[0]=3) of the first block (location_vector[1]=1) of the second frame (location_vector[3]=2) of the array. The series (location_vector[0], location_vector[1], ..., location_vector[n−1]) is referred to, hereinafter, as "location vector" indicating the location of an element in a memory array. A person versed in the art can appreciate that location vector can be implemented as an array.

The following example illustrates how to compute the start address of element (3, 2, 1) in an exemplary access template where n=3, $OOf_0$=3, $S_1$=3, $S_2$=2, $S_3$=2, $GOf_0$=12, $GOf_1$=−30 and $GOf_2$=4. The example also assumes that the array's start address is SA=28,657.

In this exemplary case:

n=3;

$OOf_1 = (S_1-1)GOf_0 + S_1 OOf_0 = 33$;

$OOf_2 = (S_2-1)GOF_1 + S_2 OOf_1 = 36$;

And therefore, $$\text{Address}(3, 2, 1) = 28{,}657 + (\text{location\_vector}[0] - 1)(OOf_0 + GOf_0) + \sum_{i=1}^{2} (\text{location\_vector}[i] - 1)(OOf_i + GOf_i) = 28{,}657 + 33 = 28{,}690$$

That is, in the example above, the start address of the third element of the second block of the first cluster of an array starting at address 28,657 is 28,690.

Figure 3:
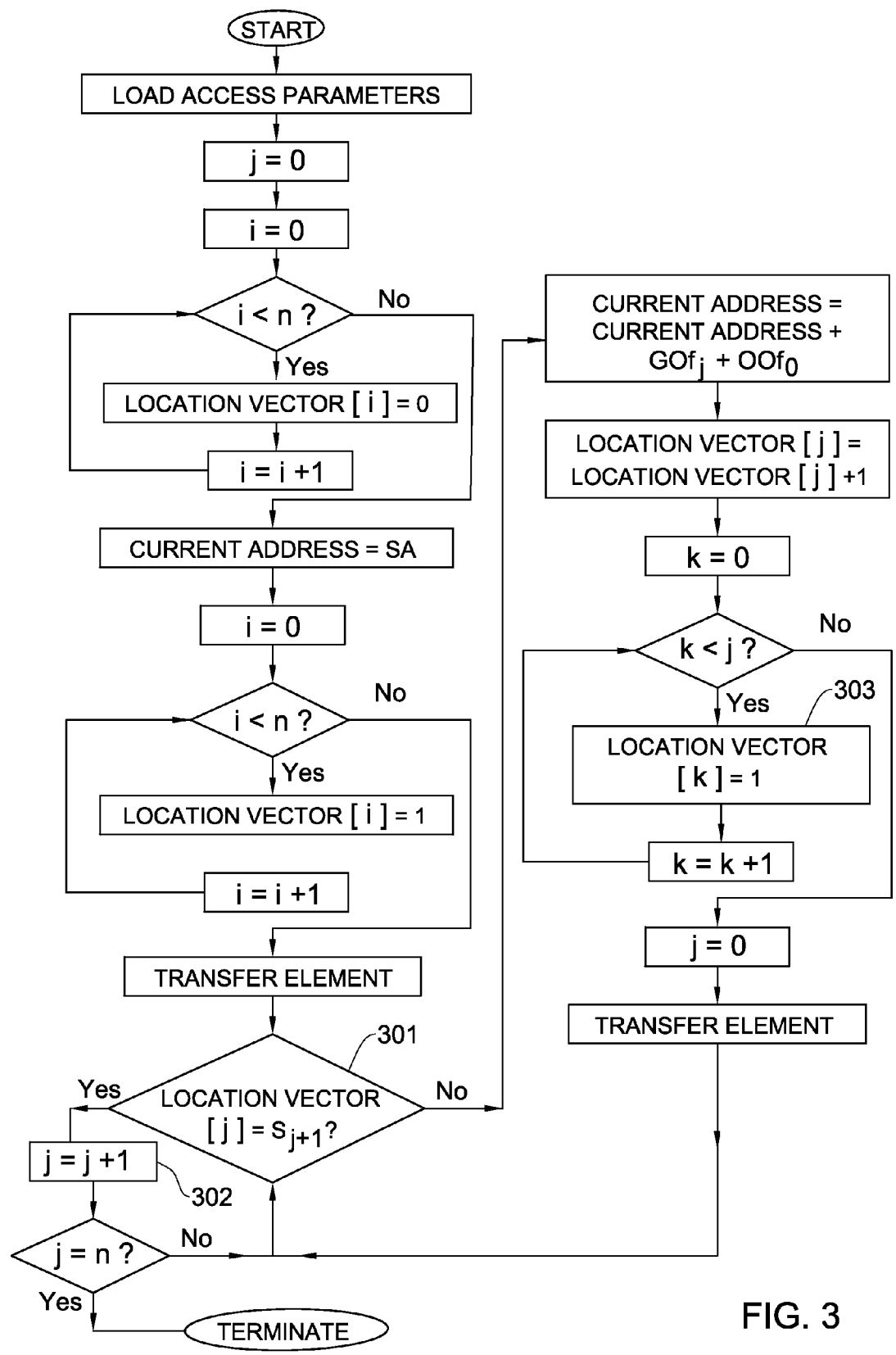
FIG. 3 is a flow chart illustrating access to the elements comprising a memory array, according to one embodiment of the invention.

FIG. 3 is an exemplary flow chart illustrating access to the elements comprising a memory array, according to one embodiment of the invention which, for the sake of clarity, will be described with reference to similar transfer parameters as those used in the example above that accompanied equations 1 and 2. That is: n=3, SA=28,657, $OOf_0$=3, $GOf_0$=12, $GOf_1$=−30, $GOf_2$=4, $S_1$=3, $S_2$=2 and $S_3$=2. It should be noted that the method illustrated in the flow chart, applies to reading data from a source array or to writing data to the destination array. Therefore, instead of using the terms "read" or "write", the general term "access" is used.

The order sizes, the level gaps and the start address (constituting "access parameters") can be stored in registers as known in the art, the registers storing the access parameters being referred to, hereinafter, as "access configuration registers".

During initialization, access parameters are loaded to the access configuration registers and all counters (such as i, j and the members of a location vector represented by a location vector array) are set to zero. The loaded access parameters are used to determine the access template. After setting the initial current address to SA (the start address), one element, i.e. the first element is transferred (3 words according to the example, as $OOf_0$=3).

It is to be noted that the first element to be transferred is the first element of the first block of the first cluster of the first frame, that is the location vector representing the first element to be transferred is (1, 1, 1).

According to the example, when j=0, $S_{j+1}=S_1=3$, i.e., there are three elements in a block, and therefore there two are more elements in the first block that should be transferred before moving to the next block. At 301 location vector[0] (which is equal to 1) does not match $S_1$ (which is 3). After transferring the first element, it is required to advance the current address to the beginning of the next element. It will be appreciated that the next element to be transferred is (2, 1, 1), and in order to get to element (2, 1, 1) the element gap should be taken into account. Therefore, current address is set to current address+$GOf_0+OOf_0$ and becomes 28,672 (28,657+3+12). The location vector is set to (2, 1, 1) by increasing location vector[0] by 1 and one element, i.e. element (2, 1, 1) is transferred.

It should be noted that after the location_vector is set to (2, 1, 1), an auxiliary parameter (k) is initialized. The role of k will be demonstrated later in this example, but at this stage, because j=0 and k=0, the loop relating to "k<j" is skipped.

The value of location vector[j], that is, of location vector[0] is equal to 2. Therefore, when returning to 301, it is determined that location vector[j] still does not match to $S_1$ (which is 3), current address is set to point for the third element (whose address is 28,672 according to the example), the location vector is set to (3, 1, 1) by setting location vector[0] to 3 and one element, i.e. element (3,1,1) is transferred.

At this stage, when the method returns to 301, it is found that location vector[0] is 3, which is equal to $S_1$. Indeed, one can appreciate that the next element to be transferred is (1, 2, 1), that is, the first element of the second block of the first cluster. Therefore, at 302*j* is set to 2 and the process repeats. Now the first element of the second block, i.e. element (1, 2, 1) should be transferred, then the second element of the second block (2, 2, 1), the third element (3, 2, 1), and then the method moves to the second cluster (1, 1, 2) etc.

Before transferring element (1, 2, 1) location vector[1] is equal to 1 which is found (at 301) to be smaller than $S_2$ (according to the example, $S_2$ is 2, i.e., there are two blocks in a cluster). Therefore, the current address is set to be current address+$OOf_0$+$GOf_1$, which is 28,660 (28,687+3−30). By setting location vector[1] to 2 the location vector becomes (3, 2, 1), but as was already mentioned, the next element to be transferred is (1, 2, 1). Therefore the auxiliary parameter k is required in order to set location vector[0] to 1 at 303. The parameter j is re-initialized to be zero, and one element, i.e. element (1, 2, 1) is transferred. As explained before, the second and third elements of the second block are also transferred, and thereafter the next element will be (1, 1, 2), that is, the first element of the first block of the second cluster. At 302*j* will become 2 and at 303 location vector[0] and location vector[1] will become 1.

It should be noted that the example is non-limiting. The access template can sometimes include different parameters than those included in the example. For example, instead of including the order sizes ($S_i$), a template can include order offsets ($OOf_i$) for each order in the memory array. It will be appreciated that when n, SA, $OOf_i$ (i=0, 1, ..., n−1) and $GOf_i$ (i=0, 1, ..., n−1) are known, it is possible to determine the order sizes ($S_i$) of the different orders.

Figure 4:
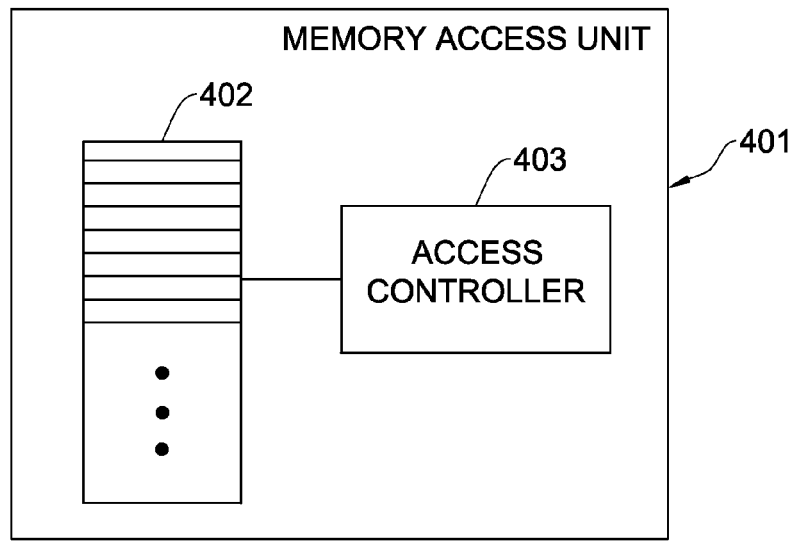
FIG. 4 illustrates a memory access unit according to the embodiment.

According to one embodiment of the invention, access to memory arrays is performed by a memory access unit, which constitutes part of the DMA 103. FIG. 4 illustrates a memory access unit 401 according to the embodiment. The memory access unit 401 includes access configuration registers 402, wherein those access parameters that are part of an access template are stored. The transfer configuration registers are coupled to an access controller 403, where address values are computed, for example in accordance with Equations 1 and 2 or in accordance with the exemplary flowchart illustrated in FIG. 3. The access controller 403 reads the access parameters from the transfer configuration registers 402, to yield the next address to be accessed in the memory array. The memory access unit 401 can then access data stored in the next address. It is to be noted that if the memory array is a source array then the access is for reading data, while for a destination memory array the access is for writing data. That is, the memory access unit 401 can perform read and/or write operations.

When data transfer is done without restructuring, the access parameters defining the access templates are substantially similar in the source access template and in the destination access templates. That is, the number of orders, the order offsets, the order gap offsets and the order sizes are substantially similar in both the source and destination array. However, in those cases when the data transfer is done with restructuring, at least one of the access parameters should be defined for both source and destination arrays respectively. This gives rise to the following access parameters:

a number of source orders (n);

a respective source order offset ($OOf_i$) of each one of the n orders (where i=0,1, ..., n−1). For example, when n=3 the source order offsets are at least a "source element offset" ($OOf_0$), a "source block offset" ($OOf_1$) and a "source cluster offset" ($OOf_2$);

a respective source order gap offset ($GOf_i$) of each of the first n orders (where i=0, 1, ..., n−1). For example, when n=3 the source order gap offsets are a "source element gap offset" ($GOf_0$), a "source block gap offset" ($GOf_1$) and a "source cluster gap offset" ($GOf_2$);

a respective source order sizes ($S_i$) of each of the last n orders (where i=1, ..., n). For example, when n=3 the source order sizes are a "source block size" ($S_1$), a "source cluster size" ($S_2$) or a "source frame size" ($S_3$);

a number of destination orders (m);

a respective destination order offset ($OOf_i$) of each one of the m orders (where i=0,1, ..., m−1). For example, when m=3 the destination order offsets are at least a "destination element offset" ($OOf_0$), a "destination block offset" ($OOf_1$) and a "destination cluster offset" ($OOf_2$);

a respective destination order gap offset ($GOf_i$) of each of the first m orders (where i=0,1, ..., m−1). For example, when m=3 the destination order gap offsets are a "destination element gap offset" ($GOf_0$), a "destination block gap offset" ($GOf_1$) and a "destination cluster gap offset" ($GOf_2$); and a respective destination order size ($S_i$) of each of the last m orders (where i=1, ..., m). For example, when m=3 the destination order sizes are a "destination block size" ($S_1$), a "destination cluster size" ($S_2$) or a "destination frame size" ($S_3$);

All the access parameters are stored in the transfer configuring registers 402. It should be noted that when the data transfer is done with restructuring, sometimes some of the source access parameters are substantially similar to the destination access parameters. In such a case it is unnecessary to store such similar access parameters twice, and storing them only one is sufficient.

It is to be noted that not all the access parameters are required for access, as was previously explained. For example, if the access template includes the respective order sizes, the respective order offsets can be omitted and vice versa: if the access template includes the respective order offsets, the respective order sizes can be omitted.

Figure 5:
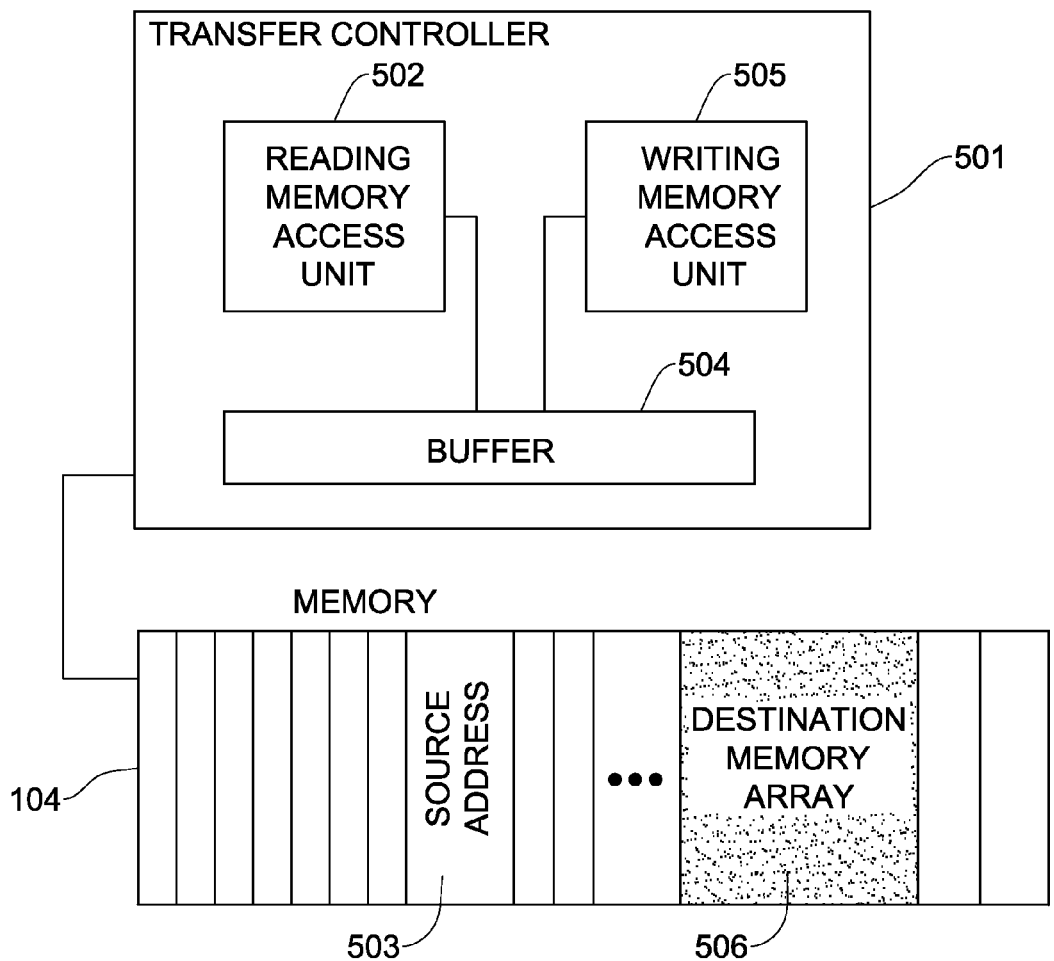
FIG. 5 is a block diagram illustrating a transfer controller according to one embodiment of the invention.

FIG. 5 is a block diagram illustrating a transfer controller 501 according to one embodiment of the invention. A reading memory access unit 502 coupled to memory 104, accesses source addresses in the memory 104, reads data therefrom and conveys the data to a buffer 503 that is also coupled to the reading memory access unit 502. A writing memory access unit 504 that is also coupled to the buffer 503 and to the memory 104 conveys the data from the buffer 503 to a destination memory array 506 in the memory 104. It is to be appreciated that the reading memory access unit 502 and the writing memory access unit 504 can be realized by the memory access unit 401 illustrated in FIG. 4. A transfer controller such as transfer controller 501 can be used in a DMA controller for transferring data with or without restructuring.

The described embodiment is non-limiting and a person skilled in the art will appreciate that other embodiments are also possible such as an embodiment where the buffer 504 does not exist. In such an embodiment data is read from the source array and input directly into the destination array. In a different embodiment one memory access unit can perform both reading and writing. In the illustrated embodiment the buffer 504 forms part of the transfer controller 501. However, this is too non-limiting and a person versed in the art will appreciate that the buffer 504 can be external to the transfer controller and coupled thereto. Alternatively, one buffer 504 can be used by both the reading memory access unit 502 and the writing memory access unit 504.

It will be appreciated that the transfer controller 501 and memory access units 401 are operative whenever memory management is required, and not only when coupled to a DMA controller. For example, the memory access unit 401 can be used for moving segments of data on disks.

The invention claimed is:

1. A method of operating a Direct Memory Access (DMA), the method comprising:
   receiving at the DMA an instruction to access a succession of data elements within a multi-ordered memory array characterized by two or more orders;
   configuring an access controller of the DMA according to an access template defining a succession of data elements within the multi-ordered memory array, wherein within at least one of an order and across two or more orders, a respective succession of data elements is associated with non-sequential memory addresses;
   configuring a single channel of the DMA to access the non-sequential memory addresses by setting respective memory access registers of the DMA with address values according to the succession of data elements set forth by the access template, thereby enabling access by the single channel of the DMA to the corresponding non-sequential memory addresses.

2. The method according to claim 1, wherein the multi-ordered memory array is a two-dimensional matrix of memory addresses associated with data words and columns and wherein the access template defines three or more orders over said two dimensional multi-ordered memory array.

3. The method according to claim 1, wherein the access template is characterized by:
   a number (n) indicating how many orders (Oi for i=0, 1, ..., n−1) are to be accessed in the multi-ordered memory array;
   an order offset of at least a first order (OOf0) of the multi-ordered memory array;
   an order size (Si) of each one of the orders Oi (where i=0, 1, ..., n−1) of the multi-ordered memory array; and
   an order gap offset (GOfi) of each one of the orders Oi (where i=0,1, ..., n−1).

4. The method according to claim 3, wherein the multi-ordered memory array is associated with a start address defining the address of the first element in the multi-ordered memory array.

5. The method according to claim 3, wherein the order offset of the first order (OOf0) is a predetermined constant.

6. The method according to claim 3, wherein each of said orders is associated with a respective order offset.

7. The method according to claim 3, wherein the addresses of said succession of data elements within the multi-ordered memory array are determined in accordance with the following formula:

$$\text{Address} = SA + (\text{location\_vector}[0] - 1)(OOf_0 + GOf_0) + \sum_{i=1}^{n-1} (\text{location\_vector}[i] - 1)(OOf_i + GOf_i)$$

where location_vector[i] is the position of a member of the ith order in a member of the ith+1 order.

8. The method according to claim 7, wherein OOfi is determined in accordance with the following formula:

$$OOf_j = (S_j - 1)GOf_{j-1} + S_j OOf_{j-1}$$

where i>=1.

9. A Direct Memory Access (DMA), comprising:
   a memory access unit adapted to receive an instruction to access a succession of data elements within a multi-ordered memory array characterized by two or more orders;
   an access controller configured by an access template defining a succession of data elements within the multi-ordered memory array, wherein within at least one of an order and across two or more orders, a respective succession of data elements is associated with non-sequential memory addresses; and
   said access controller is further configured to program memory access registers of a selected single channel of the DMA with address values according to the succession of data elements set forth by the access template, thereby enabling access by the selected single channel of the DMA to the corresponding non-sequential memory addresses.

10. The Direct Memory Access (DMA) of claim 9, wherein the multi-ordered memory array is a two-dimensional matrix of memory addresses associated with data words and columns and wherein the access template defines three or more orders over said two dimensional multi-ordered memory array.

11. The Direct Memory Access (DMA) of claim 9, wherein the access template is characterized by:
    a number (n) indicating how many orders (Oi for i=0, 1, ..., n−1) are to be accessed in the multi-ordered memory array;
    an order offset of at least a first order (OOf0) of the multi-ordered memory array;
    an order size (Si) of each one of the orders Oi (where i=0, 1, ..., n−1) of the multi-ordered memory array; and
    an order gap offset (GOfi) of each one of the orders Oi (where i=0,1, ..., n−1).

12. The Direct Memory Access (DMA) of claim 11, wherein the multi-ordered memory array is associated with a start address defining the address of the first element in the multi-ordered memory array.

13. The Direct Memory Access (DMA) of claim 11, wherein the order offset of the first order (OOf0) is a predetermined constant.

14. The Direct Memory Access (DMA) of claim 11, wherein each of said orders is associated with a respective order offset.

15. A method of operating a Direct Memory Access (DMA) for transferring data from non-sequential memory addresses from a first location in a multi-ordered memory to a second location in a memory using a single channel of the DMA, comprising:
    receiving at the DMA an instruction to transfer a succession of data elements from a first multi-ordered memory array characterized by n orders (n≧2) to a second multi-ordered memory array characterized by m orders (m≧2 and m≠n);
    configuring an access controller of the DMA according to an access template defining a succession of data elements within the first multi-ordered memory array, wherein within at least one of an order and across two or more orders, a respective succession of data elements is associated with non-sequential memory addresses within the first multi-ordered memory array;
    configuring a single channel of the DMA to read the non-sequential memory addresses within the first multi-ordered memory array by setting respective memory access registers of the DMA with address values according to the succession of data elements set forth by the access template associated with the first multi-ordered memory array, thereby enabling access by the single channel of the DMA to the corresponding non-sequential memory addresses within the first multi-ordered memory array;

configuring an access controller of the DMA according to an access template defining a succession of data elements within the second multi-ordered memory array, wherein within at least one of an order and across two or more orders a respective succession of data elements is associated with non-sequential memory addresses within the second multi-ordered memory array; and configuring the single channel of the DMA to write the non-sequential memory addresses within the second multi-ordered memory array by setting respective memory access registers of the DMA with address values according to the succession of data elements set forth by the access template associated with the second multi-ordered memory array, thereby enabling access by the single channel of the DMA to the corresponding non-sequential memory addresses within the second multi-ordered memory array.

16. The method according to claim 15, wherein the first multi-ordered memory array is associated with a first start address defining the address of the first element in the first multi-ordered memory array and the second multi-ordered memory array is associated with a second start address defining the address of the first element in the second multi-ordered memory array.

17. The method according to claim 15, wherein the access template defining a succession of data elements within the first multi-ordered memory array is characterized by:
- a number (n) indicating how many orders (Oi for i=0, 1, ..., n−1) are to be accessed in the first multi-ordered memory array;
- an order offset of at least a first order (OOf0) of the first multi-ordered memory array;
- an order size (Si) of each one of the orders Oi (where i=0, 1, ..., n−1) of the first multi-ordered memory array; and
- an order gap offset (GOfi) of each one of the orders Oi (where i=0,1, ..., n−1) of the first multi-ordered memory array.

18. The method according to claim 15, wherein the access template defining a succession of data elements within the second multi-ordered memory array is characterized by:
- a number (m) indicating how many orders (Oi for i=0, 1, ..., m−1) are to be accessed in the second multi-ordered memory array;
- an order offset of at least a first order (OOf0) of the second multi-ordered memory array;
- an order size (Si) of each one of the orders Oi (where i=0, 1, ..., m−1) of the second multi-ordered memory array; and
- an order gap offset (GOfi) of each one of the orders Oi (where i=0,1, ..., m−1) of the second multi-ordered memory array.

19. The method according to claim 18, wherein the order offset of the first order (OOf0) of the first multi-ordered memory array is a predetermined constant.

20. The method according to claim 18, wherein each of said orders of the first multi-ordered memory array is associated with a respective order offset.

21. The method according to claim 18, wherein the order offset of the first order (OOf0) of the second multi-ordered memory array is a predetermined constant.

22. The method according to claim 18, wherein each of said orders of the second multi-ordered memory array is associated with a respective order offset.

23. The method according to claim 15, wherein the first multi-ordered memory array is a two-dimensional matrix of memory addresses associated with data words and columns and wherein the access template defines three or more orders over said two dimensional multi-ordered memory array.

24. The method according to claim 15, wherein the second multi-ordered memory array is a two-dimensional matrix of memory addresses associated with data words and columns and wherein the access template defines three or more orders over said two dimensional multi-ordered memory array.

* * * * *